(12) United States Patent
Davenport

(10) Patent No.: US 7,128,834 B2
(45) Date of Patent: Oct. 31, 2006

(54) STRAINER FOR COLLECTING DEBRIS FROM A DRAIN

(76) Inventor: Robert N. Davenport, 488 W. Como, Struthers, OH (US) 44471

( * ) Notice: Subject to any disclaimer, the term of this patent is extended or adjusted under 35 U.S.C. 154(b) by 420 days.

(21) Appl. No.: 10/758,784

(22) Filed: Jan. 15, 2004

(65) Prior Publication Data

US 2004/0144703 A1 Jul. 29, 2004

Related U.S. Application Data

(63) Continuation-in-part of application No. 10/016,588, filed on Oct. 22, 2001, now abandoned.

(60) Provisional application No. 60/241,605, filed on Oct. 20, 2000.

(51) Int. Cl.
*E02C 1/26* (2006.01)
*B01D 35/02* (2006.01)

(52) U.S. Cl. .................. 210/236; 210/460; 210/463; 4/DIG. 14; 4/292

(58) Field of Classification Search ........... 4/DIG. 14, 4/291, 292, 289; 210/460, 463, 447, 236
See application file for complete search history.

(56) References Cited

U.S. PATENT DOCUMENTS

| 1,817,376 | A | * | 8/1931 | Izquierdo | 210/447 |
| 4,045,351 | A | * | 8/1977 | Peterson | 210/238 |
| 4,949,406 | A | * | 8/1990 | Canelli | 4/679 |
| 5,525,215 | A | * | 6/1996 | Marchionda | 210/95 |
| 6,153,095 | A | * | 11/2000 | Francisco | 210/153 |

* cited by examiner

*Primary Examiner*—Terry K. Cecil
(74) *Attorney, Agent, or Firm*—Clifford A. Poff

(57) ABSTRACT

A drain strainer for debris is located in drain line having a side outlet extending to a drain line flow space. The strainer has a body bounded by sidewalls contiguous with an annular forward end wall for abutting with the drain flow space to prevent the passage of debris. An array of apertures in the strainer body, which is hemispherical or planner with upstanding sidewalls, is sufficient in number and size to maintain water flow while extracting and retaining debris occurring in the drain line flow space. A closure assembly is formed by a closure plate that supports a seal acted on by a retainer for forming a fluid tight seal with the side outlet opening of the drain line segment.

17 Claims, 5 Drawing Sheets

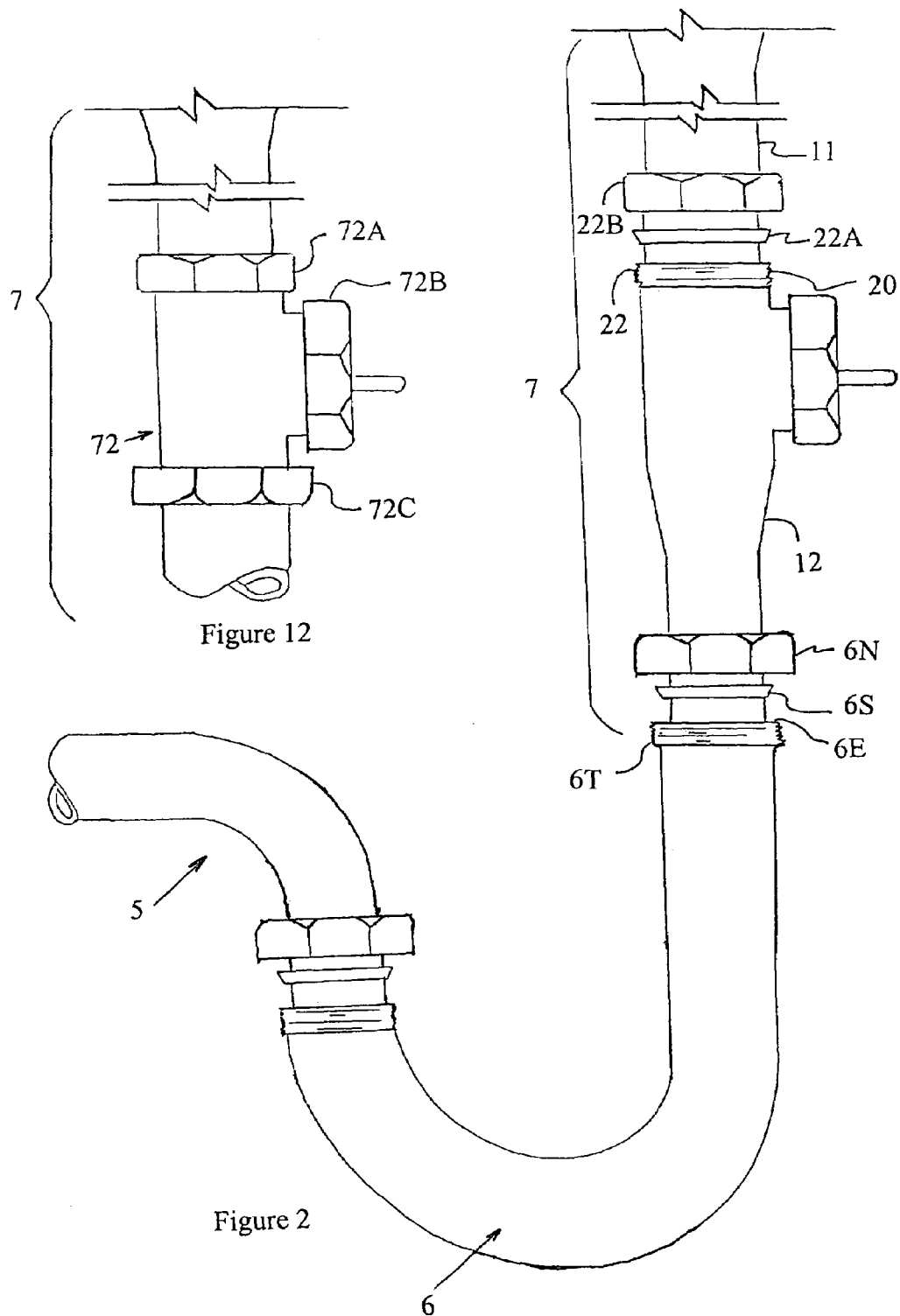

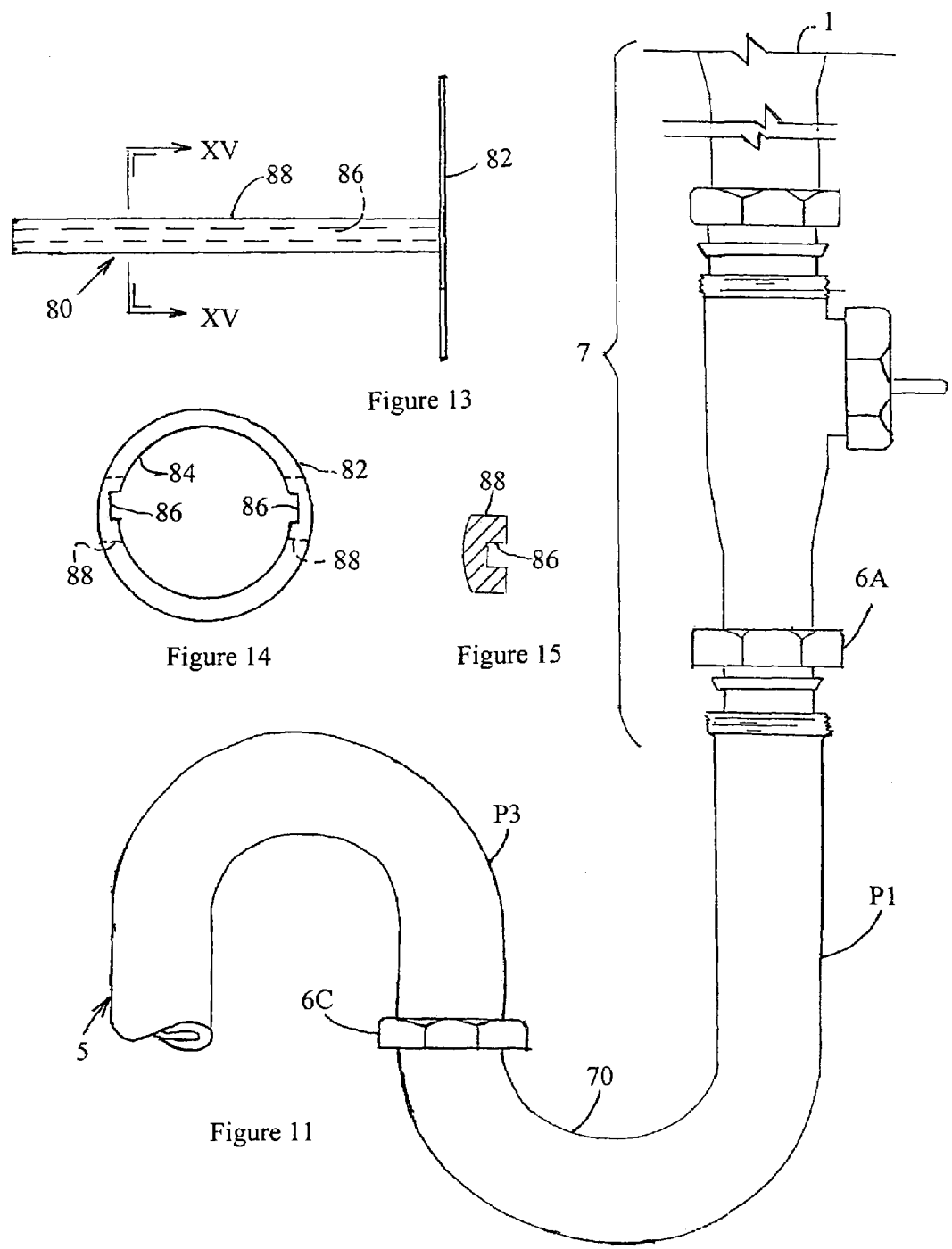

STRAINER FOR COLLECTING DEBRIS FROM A DRAIN

CROSS REFERENCE TO RELATED APPLICATIONS

This application is a continuation in part of application Ser. No. 10/016,588, filed Oct. 22, 2001 now abandoned, entitled Drain pipe filter kit and which claims the benefit of U.S. provisional patent application Ser. No. 60/241605 Filed: Oct. 20, 2000, Entitled: Add-a-trap.

BACKGROUND OF THE INVENTION

1. Field of the Invention

The present invention relates to a strainer for extracting debris from waste water discharged from a sink or the like, and, more particularly, to a drain strainer embody in construction in relation of parts to enable cleaning of debris between periods of prolong use of a strainer without undue restriction to the flow of water.

2. Description of the Prior Art

U.S. Pat. No. 6,153,095 discloses a filter canister added to a sink drain and includes a dissolvable sanitation table that can be removed for replacement the filter element in the canister. The supported structure for the filter element and the relative size of the element limits the drain area for wastewater. As the filter element, formed of mesh material such a fiber plastic, becomes progressively restricted by the entrapment of the debris there is likely to be a restraint to the flow space for the wastewater and may actual promote plugging causing water flow stoppage.

It is well known in the art to provide a p-trap or other plumbing facility as a site for debris removal to avoid clogging of the drain line for wastewater particularly at inaccessible sites along the course of the drain line. The p-trap or other facility sometimes fails to prevent clogging of the drain and requires the services of a plumber to mechanically remove the debris or the use of chemicals to fragment the clogging matter sufficiently to restore normal flow of the wastewater. The use of chemicals introduces a pollutant to the wastewater stream and, additionally, introduces a safety hazard to the living environment of a person. The operation of a p-trap or other facility to entrap potentially drain clogging substances may be ineffective when small articles e.g. toothpaste caps, are not retained and fail to pass an already existing restriction in a drain line. In addition, circumstances occur when it is desirable to recover articles such as rings, contact lenses, etc. inadvertently entering the drain but cannot be recovered by a conventional entrapment facilities. Lastly, it is desirable to allow a systematic removal of materials such as hair from the drain water to avoid the periodic clogging of a particular drain line used to carry hair-laden wastewater.

It is well known in the art to use a modified construction of the water trap or equivalent structure of a plumbing facility as a site for debris removal to avoid clogging of the drain line for wastewater. This requires replacement of the water trap to install the facility for allowing debris removal and thereafter systematic draining of the water trap to allow the operation of the debris removal facility. The present invention avoids the costs to replace the water trap and the inconvenience and exposure to the wastewater when desired to clean collected debris from the removal facility. Additionally, the present invention seeks to always maintain the original area in the drain line for the intended flow of wastewater by providing a flow space in a strainer is many times larger the original flow space in the drain line.

A serious operating problem occurs when a strainer is located in the area of the drain line used to form the conventional water trap. Water pressure is necessary to force sufficient water through the strainer even in the absence of debris to equalize the water level in the trap. This creation of water pressure artificially increases a column height of water at the entrance to the trap to such an extent that a leakage commonly occurs at the site of the annular seal acted on by the slip joint nut. This type of seal is not designed to perform in the presence of a positive water pressure and therefore allows leakage. The leakage condition is prolonged as, for example, when the presence of debris in the strainer extends the residence time of the column of water at the elevation of the slip joint nut.

Accordingly, it is an object of the present invention to provide a strainer with an effective collection and retention cavity for collecting debris from a drain provided with a drain line segment constructed to support the strainer for ease of cleaning by incorporating the strainer at a drain site that is readily accessible and readily serviceable.

It is another object of the present invention to provide an improved construction for a drain strainer having a debris collection sight sufficiently large and with apertures for wastewater to ensure periods of long use without the need to remove debris.

It is a further object of the present invention to provide a drain strainer, which can be removed and readily replaced in a drain line without the need of tools and constructed to preclude incorrect assembly to form a watertight structure.

SUMMARY OF THE INVENTION

According to the present invention there is provided a drain strainer for debris including the combination of a drain line segment having a side outlet extending to a drain line flow space, a strainer including a strainer body bounded by laterally spaced side walls contiguous with an annular forward end wall, the side walls and end wall abutting with the drain flow space for preventing passage of debris there between, the strainer body having an array of apertures for extracting and retaining debris occurring in the drain line flow space and a closure assembly including a closure plate supporting a seal acted on by a retainer for forming a fluid tight seal with the side outlet opening.

Preferably, the strainer body is hemispherical forming a concave debris retention area containing the array of apertures sufficient in number and diameter to form strainer flow spaces approximating the drain line flow space. The drain line segment includes spaced apart guides forming strainer support grooves there between for slidably engaging the side walls and annular forward end wall of the strainer at a position to space the hemispherical strainer body from a floor of the side outlet for forming a flow space there between.

More particularly, the present invention provides in a sink having a sink drain for the discharge of debris, a sink drain including a trap pipe with a first slip joint nut threadly engaged on a debris receiving end, a drain line pipe having an annular drain line flow space joined to the sink drain, the drain line pipe having a waste discharge end, a washer having an inside diameter substantially corresponding to the reduced diameter of the waste discharge end, the washer being pressed by the threaded engagement of the first slip joint nut with the trap pipe for forming a liquid tight seal, a side outlet pipe extending laterally from the drain line pipe, the side outlet pipe having a side outlet flow space extending from opposed sides of the tubular drain line flow space, a strainer having an elongated strainer body containing an array of apertures traversing the tubular drain flow space and the side outlet flow space for extracting and retaining debris occurring in the drain line flow space upstream of the side outlet pipe, the elongated strainer body having a debris retention floor bounded by laterally spaced upstanding strainer side walls interconnected by an annular upstanding strainer end wall, a terminal end closure plate joined with the debris retention floor and the laterally spaced upstanding strainer side walls, support rails extending from the upstanding strainer side walls, the elongated strainer body having a length sufficient to form an abutting engagement by the annular upstanding strainer end wall with an internal annular wall surface of the drain line flow space at the junction between the drain line flow space and the side outlet flow space, the aggregate area defined by number and diameter of the array of apertures exceed the of the transverse cross sectional areas of the drain line flow space and the a side outlet flow space, a second slip joint nut thready engaged with the side outlet pipe to press the terminal end closure plate against the side outlet pipe for forming a fluid tight seal, and spaced apart guides in the drain line flow space and the side outlet flow space for engaging the strainer support rails to resist movement of the strainer in the drain line flow space and the side outlet.

BRIEF DESCRIPTION OF THE SEVERAL VIEWS OF THE DRAWINGS

The present invention will be more fully understood when the following description is read in light of the accompanying drawings in which:

FIG. 2 is a detailed illustration of one embodiment of a drain line incorporating a J trap downstream of a drain line segment incorporating a strainer according to the present invention;

FIG. 11 is a detailed illustration of a further embodiment of a drain line incorporating an S trap downstream of a strainer according to the present invention;

FIG. 12 is a detailed illustration of a second embodiment of a drain line segment incorporating a Tee for receiving a strainer according to the present invention;

FIG. 13 is a side elevational view of an insert structure for converting a pipe fixture for receiving a strainer basket assemble according to the present invention;

FIG. 14 is a front elevational view of the insert structure shown in FIG. 13; and FIG. 15 is a section view taken along lines XV—XV of FIG. 13.

DETAILED DESCRIPTION OF THE INVENTION

Figure 1:
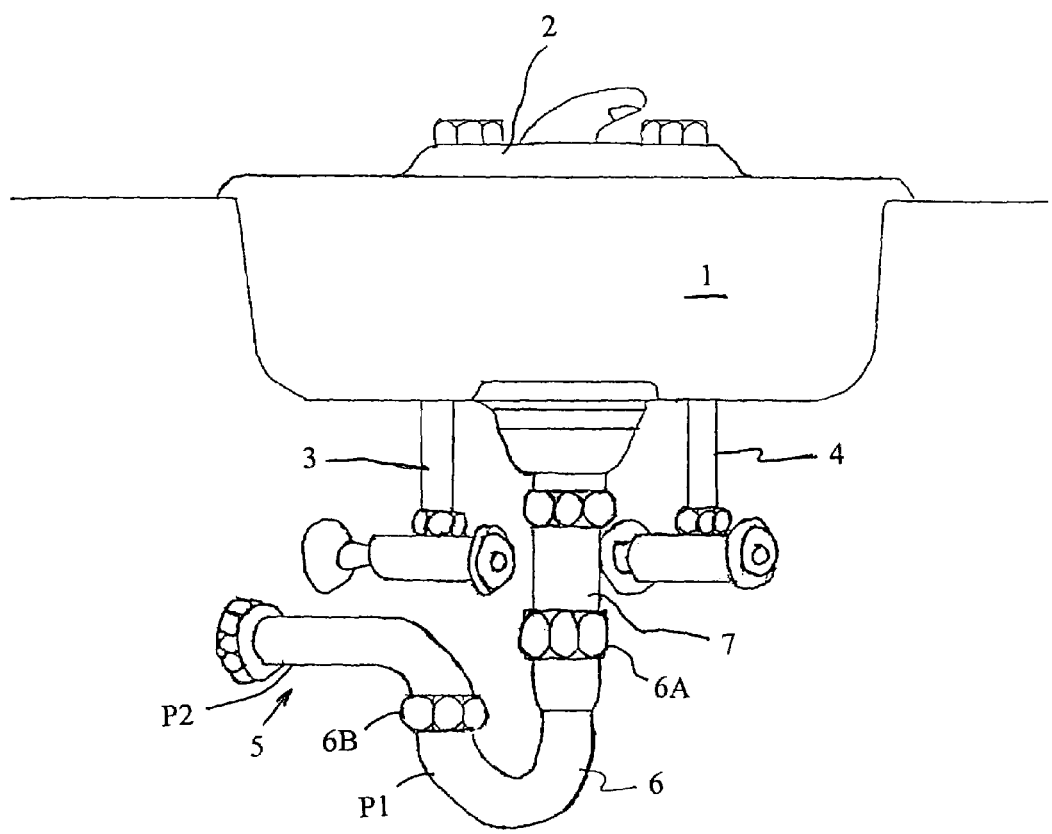
FIG. 1 is an illustration of a typical sink having a drain line suitable for incorporating a strainer of the present invention.

FIG. 1 illustrates a typical sink 1 provided with a faucet assembly 2 supplied with water from conduit lines 3 and 4. Water received in the sink is put to waste by a drain line assembly 5 that includes the usual J pipe section 6 joined to an upstream drain line 7 extending to the sink 1. As shown, the J trap section 6 is joined by a usual slip joint nut 6A to the upstream drain line 7 and incorporates a slip joint nut 6B for joining trap components P1 and P2 of the P trap section 6.

FIG. 2 illustrates greater details of a first embodiment of the upstream drain line 7 arranged in the drain line assembly 5 having the downstream p trap section 6. The upstream drain line 7 essentially includes a transition pipe element 11, such as a pipe tail, used to interconnect the sink drain fitting with the upstream end of the drain line segment 12 with external threads 20 encircling a beveled edge 22 for receiving an annular compression seal 22A and forming a compression seal by torque applied to a slip joint nut 22B. In a similar fashion, the waste discharge end of the drain line segment 12 is joined to the J pipe section 6 by a fluid tight connection formed by arranging the discharge end of the drain line segment 12 within the debris receiving end portion of the J pipe section 6. An annular seal 6S is then advanced along the segment 12 into a seated relation in an internal beveled edge 6E encircled by external threads 6T in the J pipe. A slip joint nut 6N is torqued on the external threads 6T to form a liquid tight compression seal.

Figure 4:
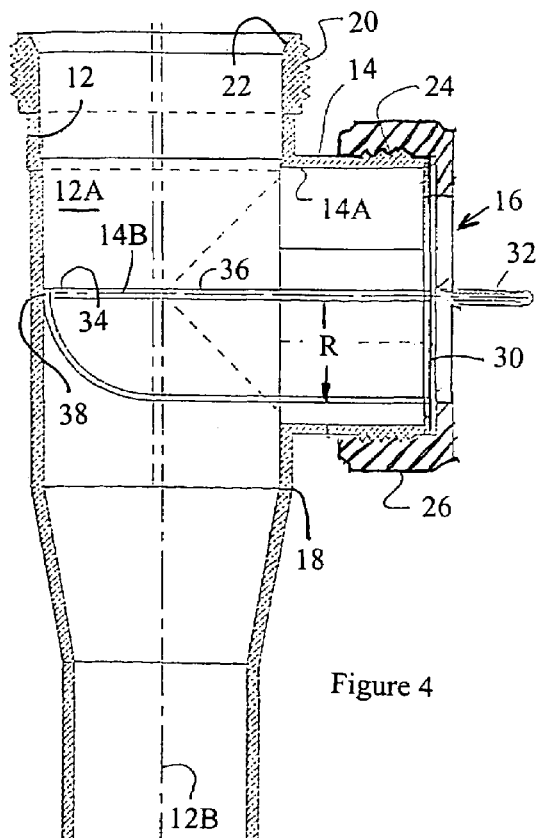
FIG. 4 is a section view taken along lines IV—IV of FIG. 3.
Figure 3:
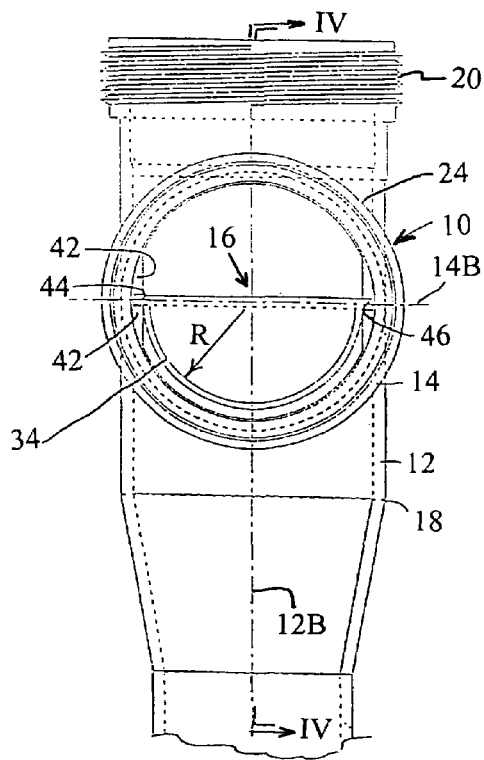
FIG. 3 is a front elevation view of a drain line segment incorporating a first embodiment of the present invention.
Figure 5:
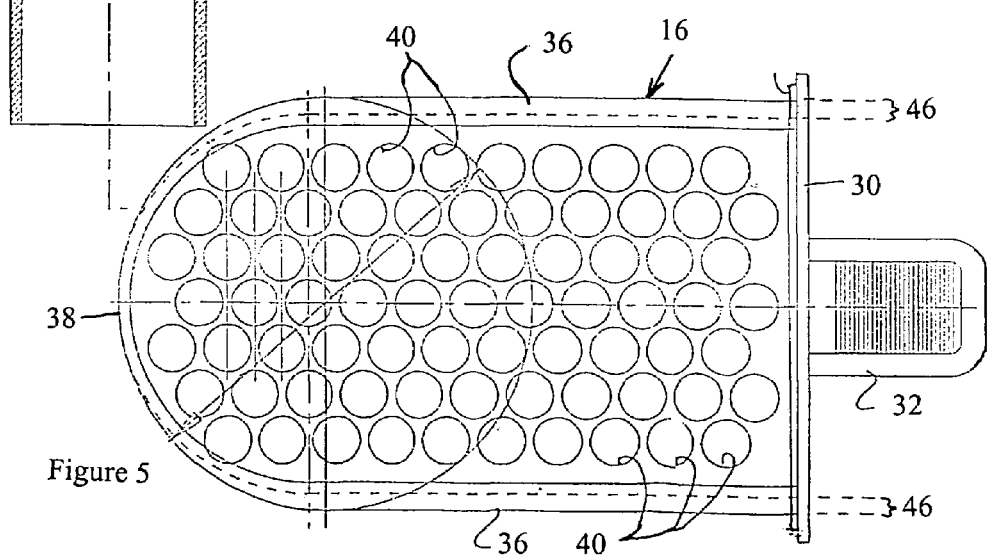
FIG. 5 is a plan view of the strainer basket assembly forming part of the present invention.
Figure 7:
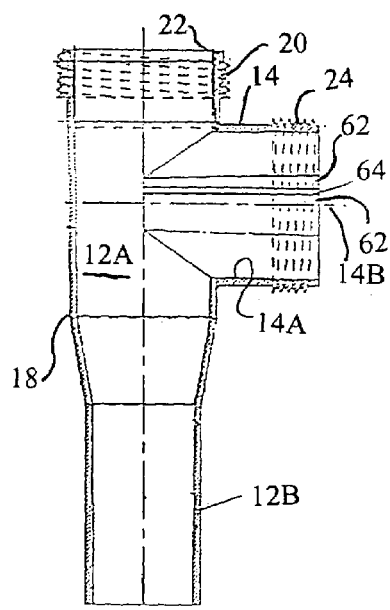
FIG. 7 is a section view taken along lines VII—VII of FIG. 6.
Figure 6:
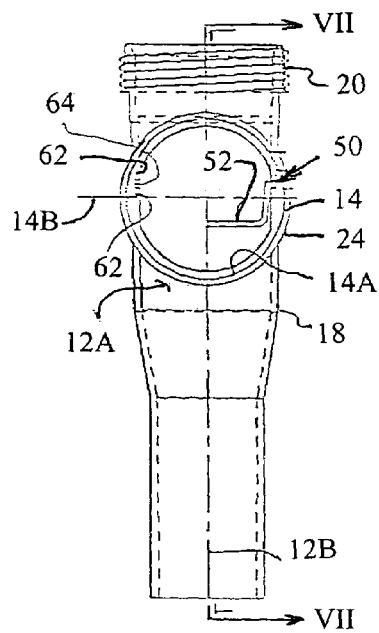
FIG. 6 is a view similar to the illustration of FIG. 3 illustrating the second embodiment of the present invention.
Figure 8:
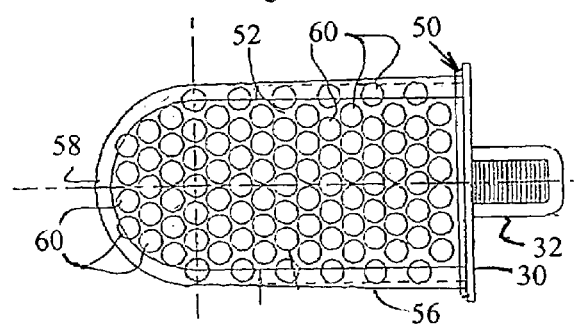
FIG. 8 is a plan view of a strainer basket assembly forming part of the second embodiment of the present invention.
Figure 10:
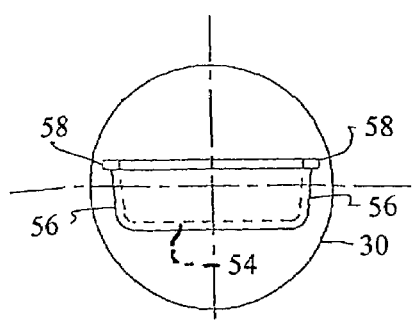
FIG. 10 is an end view of the strainer basket assembly shown in FIG. 8.
Figure 9:
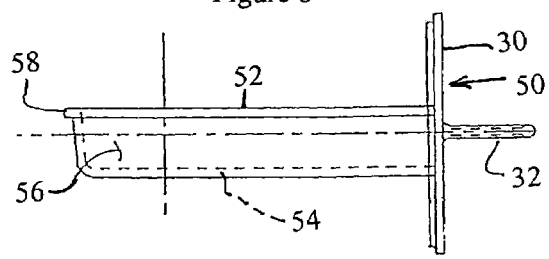
FIG. 9 is a side elevation view of the strainer basket assembly shown in FIG. 8.

FIGS. 3–5 illustrate a first embodiment of a drain strainer 10 according to the present invention. The drain strainer uses a drain line segment 12 forming part of drain line 7 and having a tubular side outlet 14 with an inside diameter 14A preferably slightly larger than the inside diameter of the drain line flow space 12A in the drain line segment 12 to maximize the size of a strainer assembly 16. The side outlet 14 is defined with an outlet central axis 14B perpendicular to and intersecting a central axis 12B of the drain line flow space 12A. It is within the scope of the present invention to use a Tee provided with compression fittings to form the required drain line segment and tubular side outlet. The piping and strainer forming the present invention can embody materials of construction belonging to the group consisting of plastic (e.g., PVC and polypropylene), copper, brass, and ferrous metals. The diameter of the drain line flow space 12A may, if desired, be reduced at a site 18 down stream of the tubular side outlet 14 to accommodate preexisting pluming conditions. External threads 20 encircle the upstream end of the drain line segment 12 where there is also located a beveled edge 22 forming a compression site for an annular seal as, per se well known in the art, for forming a compression seal with the use of a threaded nut member, not shown. External threads 24 are formed on the protruding end portion of the tubular side outlet 14 for receiving a nut member 26 to compress a face plate 30 against the end face of the tubular side outlet 14 for forming a fluid tight closure for the tubular side outlet 14.

The faceplate 30 is part of the strainer assembly 16, which also includes a handle 32 extending from the faceplate 30 at a side thereof opposite the location of a strainer body 34, secured to, and extends from the planer surface of the faceplate. The handle 32 plate dimensioned to enable a user to support and manipulate the strainer body for removal, cleaning, and replacement in the tubular side outlet 14. The strainer body 34 is bounded by laterally spaced side walls 36 contiguous with an annular forward end wall 38 to define a configuration for abutting with the internal wall surfaces at the junction of the internal flow space 12A and the internal wall of the tubular side outlet 14 for preventing passage of debris between the strainer body and the internal wall surfaces.

The strainer body in the embodiment of FIGS. 3–5 takes the form of a generally hemispherical shape struck about a radius R transverse to the extended length thereof forming a concave debris retention area containing the array of apertures 40 for extracting and retaining debris occurring in the drain line flow space on the floor wall between the apertures. The apertures 40 are sufficient in number and diameter to form strainer flow spaces approximating the drain line flow space, although distributed throughout an area comprising the flow space 12 A and the extended length of the side outlet 14. The sidewalls 36 and the end wall 38 engage the side outlet within a plane of support for the strainer remote to the outlet central axis 14B upstream along the central axis 12B of the drain line flow space to prevent inverted support of the strainer body 34 in the side outlet. The internal wall of the tubular side 14 includes spaced apart guides 42 forming strainer support grooves 44 there between for slidably engaging the sidewalls, which are generally parallel and an annular forward end wall of the strainer. The sidewalls 36 and the end wall 38 are formed with support rails 46 protruding from the sidewalls and the end wall to engage between the guides 42 for resisting torque acting on the strainer during placement of the nut member 26. The support rails 46 are positioned to extend from the walls of the drain line segment to space the hemispherical strainer body from a floor of the side outlet for forming a flow space there between.

FIGS. 6–10 illustrate the second embodiment of the present invention, which differs from the first embodiment essential by the construction of the strainer body and the location of the support rails in the side outlet for supporting the strainer body. Like reference numerals in the FIGS. 6–10 denote the same structure described hereinbefore and illustrated in FIGS. 3–5. The strainer assembly 50 is provided with a strainer body 52 having a concave shape transverse to the extended length form by a generally plainer floor wall 54 surrounded by an upstanding sidewall 56 terminating with a latterly outward support rail 58. The floor wall 54 is formed with array of apertures 60 for extracting and retaining debris occurring in the drain line flow space on the floor wall between the apertures. The strainer body 52 is integrally formed as part of the faceplate 30. The internal wall of the tubular side outlet 14 is formed with spaced apart guides 62 forming strainer support grooves 64 there between for slidably engaging the support rail 58 and retaining the strainer body at a displaced position such that the floor wall 54 is sufficiently remote to the underline surface of the tubular side outlet 14 to form a flow space there between.

In FIG. 11, the embodiment of a drain line assembly 5 incorporates an S trap 70 downstream of a strainer 10 according to the present invention. The S trap 70 is comprised of trap components P1 and P3 joined to the upstream drain line 7 extending to the sink 1. The S trap component P1 is joined by a usual slip joint nut 6A to the upstream drain line 7 and in turn joined by a slip joint nut 6C to the S trap component P3. As is well known to one skilled in the art, a J trap uses a slip joint nut 6C to a secure a down stream trap component, not shown, to the trap component P1. Thus, the known trap components of each of the P, J, and S traps include the trap component P1.

As described hereinbefore, the present invention includes the use of a Tee provided with compression fittings to form the required drain line segment and tubular side outlet, and that the piping and strainer forming the present invention can embody materials of construction belonging to the group consisting of plastic (e.g., PVC and polypropylene), copper, brass, and ferrous metals. In FIG. 12 there is illustrated a Tee 72 for receiving the strainer 10 constructed according to any of the various embodiments of the present invention. The Tee 72 is equipped with the compression fittings 72A, 72B, and 72C for forming the fluid tight connections to form part of the upstream drain line 7 and the strainer in the side outlet 72B. The side outlet of the Tee is preferably the same internal diameter as the diameters of the entry and delivery diameters so as to ensure that the flow space in the strainer always exceeds, preferably by a factor of four, the through put flow space. In applications where the strainer is used to collect debris such as lint the environment of cloth washing machine the flow space in the side outlet is preferably larger than the through put flow space of the fitting. The Tee is an example of a group of fittings that also includes a lateral, a true Y, and a double branch elbow.

A further embodiment of the present invention is illustrated in FIGS. 13–15 and provides for an insert structure 80 for carrying a strainer basket of the various embodiments according to the present invention in drainpipes and side outlet thereof. The insert structure includes a flange 82 having a ring shaped configuration dimensioned to provide an annular sealing surface to seat against the end face of the side outlet of the drainpipe. A central opening 84 in the flange is intercepted by opposed strainer support grooves 86 in side rails 88 for slidably engaging the support rails 46 protruding from the sidewalls of the strainer 16 according to the embodiment of FIGS. 3–5. Alternatively, opposed strainer support grooves 86 in side rails 88 slidably engage the support rails 64 protruding from the sidewalls of the strainer 50 according to the embodiment of FIGS. 6–10. The side rails 88 are extended linearly a distance from the flange 82 equal distances sufficient to present end portions at the commencement of the annular wall section in the inside diameter of the drain line flow space in the drain line segment. The side rails 88 are adhered by the deposit of suitable adhesive in the interface between the rails and the internal wall surface of the side outlet of the drain line segment.

While the present invention has been described in connection with the preferred embodiments of the various figures, it is to be understood that other similar embodiments may be used or modifications and additions may be made to the described embodiment for performing the same function of the present invention without deviating therefrom. Therefore, the present invention should not be limited to any single embodiment, but rather construed in breadth and scope in accordance with the recitation of the appended claims.

The invention claimed is:

1. In a sink having a sink drain for the discharge of debris, said sink drain including:
 a trap pipe with a first slip joint nut threadedly engaged on a debris receiving end;
 a drain line pipe having a tubular drain line flow space joined to said sink drain, said drain line pipe having a waste discharge end including a reduced diameter;

a washer having an inside diameter substantially corresponding to said reduced diameter of said waste discharge end, said washer being pressed by the threaded engagement of said first slip joint nut with said trap pipe for forming a liquid tight seal;

a side outlet pipe extending laterally from said drain line pipe, said side outlet pipe having a side outlet flow space extending from opposed sides of said tubular drain line flow space;

a strainer having an elongated strainer body containing an array of apertures traversing said tubular drain flow space and said side outlet flow space for extracting and retaining debris occurring in said drain line flow space upstream of said side outlet pipe, said elongated strainer body having a debris retention floor bounded by laterally spaced upstanding strainer side walls interconnected by an annular upstanding strainer end wall, a terminal end closure plate joined with said debris retention floor and said laterally spaced upstanding strainer side walls, support rails extending from said upstanding strainer side walls, said elongated strainer body having a length sufficient to form an abutting engagement by said annular upstanding strainer end wall with an internal annular wall surface of said drain line flow space at the junction between said drain line flow space and said side outlet flow space, an aggregate area defined by the number and diameter of said array of apertures exceed the transverse cross sectional areas of said drain line flow space and said side outlet flow space;

a second slip joint nut threadly engaged with said side outlet pipe to press said terminal end closure plate against said side outlet pipe for forming a fluid tight seal;

spaced apart guides in said drain line flow space and said side outlet flow space for engaging said strainer support rails to resist movement of said strainer in said drain line flow space and said side; and an insert structure defining said spaced apart guides for placement in said side outlet flow space to engage said strainer support rails, wherein said insert structure comprises a flange having a central opening intercepted by opposed strainer support grooves formed within respective insert structure side rails for slidably engaging said strainer support rails.

2. The sink drain according to claim 1 wherein said sink drain line further includes a sink tail piece for conducting a waste discharge to said drain line pipe, and a third slip joint nut threadly engaged with said drain line pipe for forming a fluid tight seal with said sink tail piece.

3. The sink drain according to claim 1 wherein said annular drain line pipe extends along opposed sides to opposed linear sides of said side outlet pipe.

4. The sink drain according to claim 1 wherein said side outlet pipe is tubular having a central outlet axis perpendicular to and intersecting a central longitudinal axis of said drain line flow space.

5. The sink drain according to claim 4 wherein said elongated strainer body is defined by a hemispherical cross sectional configuration forming a concave debris retention area containing said array of apertures and wherein said upstanding strainer side walls and said annular upstanding strainer end wall engage said side outlet pipe within a plane of support for said strainer remote to said central outlet axis sufficiently upstream along said central longitudinal axis of said drain line flow space to prevent inverted support of said strainer in said side outlet pipe.

6. The sink drain according to claim 4 further including a support rail protruding from said annular upstanding strainer end wall to engage between said guides for resisting torque acting on said strainer during placement of said second slip joint nut.

7. The sink drain according to claim 5 wherein said strainer body is suspended on said laterally spaced strainer support rails at a position to space said hemispherical strainer body from said side outlet pipe and form a flow space therebetween.

8. The sink drain according to claim 1 wherein said upstanding strainer side walls are parallel residing along parallel sides of said side outlet flow space.

9. The sink drain according to claim 1 further including a handle extending from said terminal end closure plate at a side thereof opposite said elongated strainer body.

10. The sink drain according to claim 1 further including a seal between said terminal end closure plate and said side outlet pipe.

11. The sink drain according to claim 1 wherein said apertures are sufficient in number and diameter to form strainer flow spaces approximating four times said drain line flow space.

12. The sink drain according to claim 1 wherein said trap pipe includes threads encircling said debris receiving end for engaging said first slip joint nut.

13. The sink drain according to claim 1 wherein said debris retention floor is planer between said laterally spaced upstanding side walls to space said elongated strainer body from said side outlet pipe for forming a flow space there between.

14. The sink drain according to claim 1 wherein said trap pipe comprises a P trap.

15. The sink drain according to claim 1 wherein said trap pipe comprises a J trap.

16. The sink drain according to claim 1 wherein said trap pipe comprises an S trap.

17. The sink drain according to claim 1 wherein said side outlet pipe and said drain line pipe are integral and comprises a Tee.

* * * * *